US007137716B2

(12) United States Patent  
Bogard et al.

(10) Patent No.: US 7,137,716 B2
(45) Date of Patent: Nov. 21, 2006

(54) VEHICLE AUXILIARY REAR VIEW MIRROR ASSEMBLY AND METHOD

(76) Inventors: Donald E. Bogard, #1 Levelwind Ct., Greensboro, NC (US) 27455; John M. Sinanis, 41555 Burroughs Ave., Novi, MI (US) 48377

(*) Notice: Subject to any disclaimer, the term of this patent is extended or adjusted under 35 U.S.C. 154(b) by 0 days.

(21) Appl. No.: 10/746,163

(22) Filed: Dec. 29, 2003

(65) Prior Publication Data
US 2005/0141113 A1    Jun. 30, 2005

(51) Int. Cl.
G02B 5/10      (2006.01)
G02B 7/182     (2006.01)
G02B 27/00     (2006.01)
B60R 1/04      (2006.01)

(52) U.S. Cl. .............. 359/855; 359/862; 359/863; 359/865; 359/601; 248/479; 248/487

(58) Field of Classification Search ............... 359/855, 359/862, 865, 601, 850, 856, 857, 863, 876; 248/479, 487
See application file for complete search history.

(56) References Cited

U.S. PATENT DOCUMENTS

| | | | | |
|---|---|---|---|---|
| 1,533,937 A | * | 4/1925 | Mogor | 359/855 |
| 1,570,751 A | * | 1/1926 | Langley | 359/855 |
| 1,763,550 A | * | 6/1930 | Beauchamp | 359/855 |
| 1,844,437 A | * | 2/1932 | Paxton | 359/861 |
| 1,986,033 A | * | 1/1935 | Trufant | 359/846 |
| 2,075,900 A | * | 4/1937 | Jackson | 359/862 |
| 2,197,280 A | * | 4/1940 | Topping | 359/861 |
| 2,374,956 A | * | 5/1945 | Rubissow | 356/138 |
| 4,497,541 A | * | 2/1985 | Okamura | 359/726 |
| 4,731,708 A | * | 3/1988 | Gonas | 362/544 |
| 4,909,618 A | * | 3/1990 | Gardner | 359/862 |
| 5,453,882 A | * | 9/1995 | Westman | 359/855 |
| 2003/0007263 A1 | * | 1/2003 | Morrison | 359/860 |
| 2004/0057133 A1 | * | 3/2004 | Chen | 359/844 |

FOREIGN PATENT DOCUMENTS

| | | | |
|---|---|---|---|
| DE | 1808363 | * | 6/1970 |
| JP | 08-282378 | * | 10/1996 |
| JP | 11-170911 | * | 6/1999 |
| NL | 6407141 | * | 12/1964 |

* cited by examiner

Primary Examiner—Ricky D. Shafer
(74) Attorney, Agent, or Firm—Alex Rhodes

(57) ABSTRACT

An auxiliary rear view mirror assembly for increasing a driver's lateral and rearward field of vision without adversely affecting the driver's forward field of vision. The auxiliary rear view mirror assembly is mounted at the rear of a vehicle in a location which is visible in a main rear view mirror of the vehicle. The auxiliary rear view mirror assembly is comprised of a pair of auxiliary rear view mirrors which are independently selectively adjustable about a pair of axes and selectively adjustable about a second axis which is in orthogonal relationship to the first pair of axis. In a first embodiment, the auxiliary rear view mirror assembly is mounted on a rear window of the vehicle. In a second embodiment, the auxiliary rear view mirror assembly is mounted on a rear brake light. In a third embodiment, the auxiliary rear view mirror assembly is combined with a rear brake light and is remotely adjustable by a set of controls which are accessible to the driver.

3 Claims, 5 Drawing Sheets

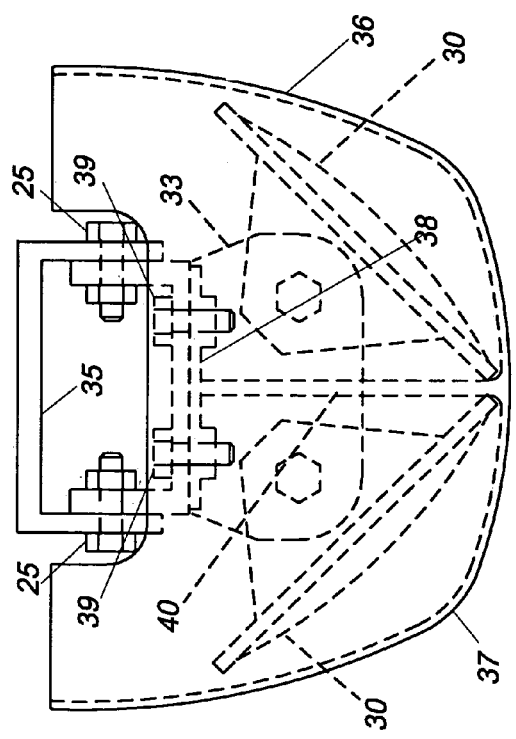
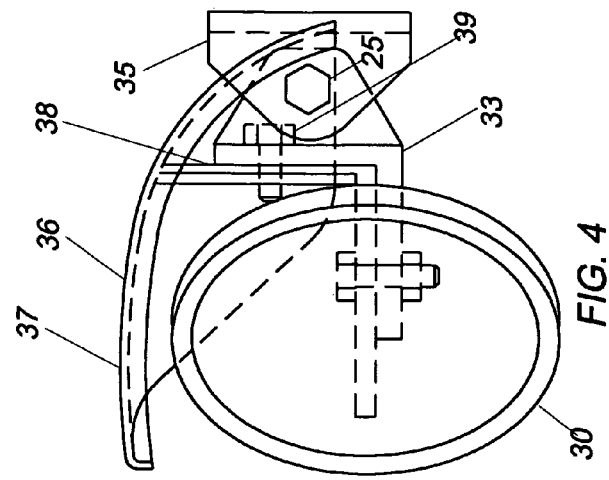
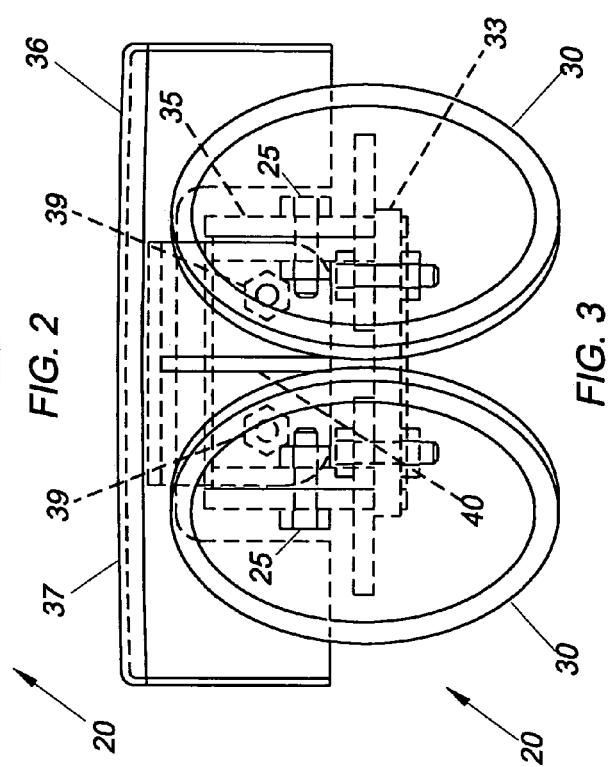

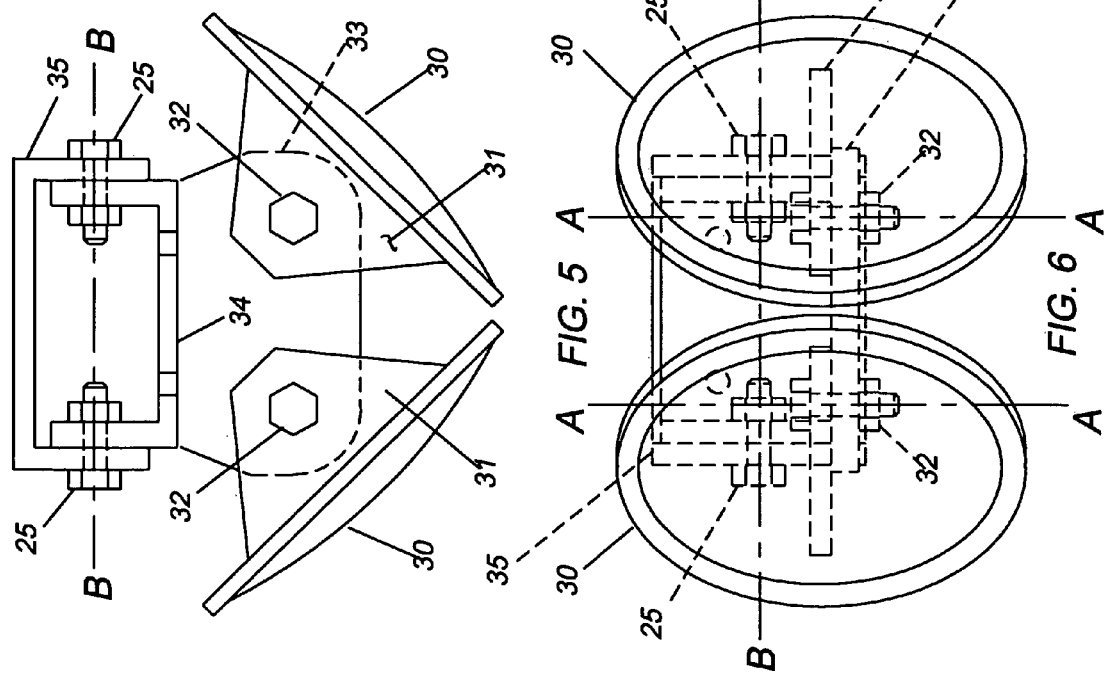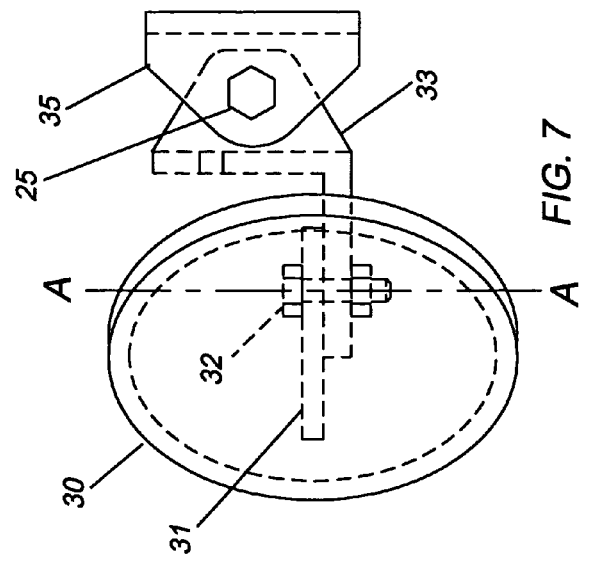

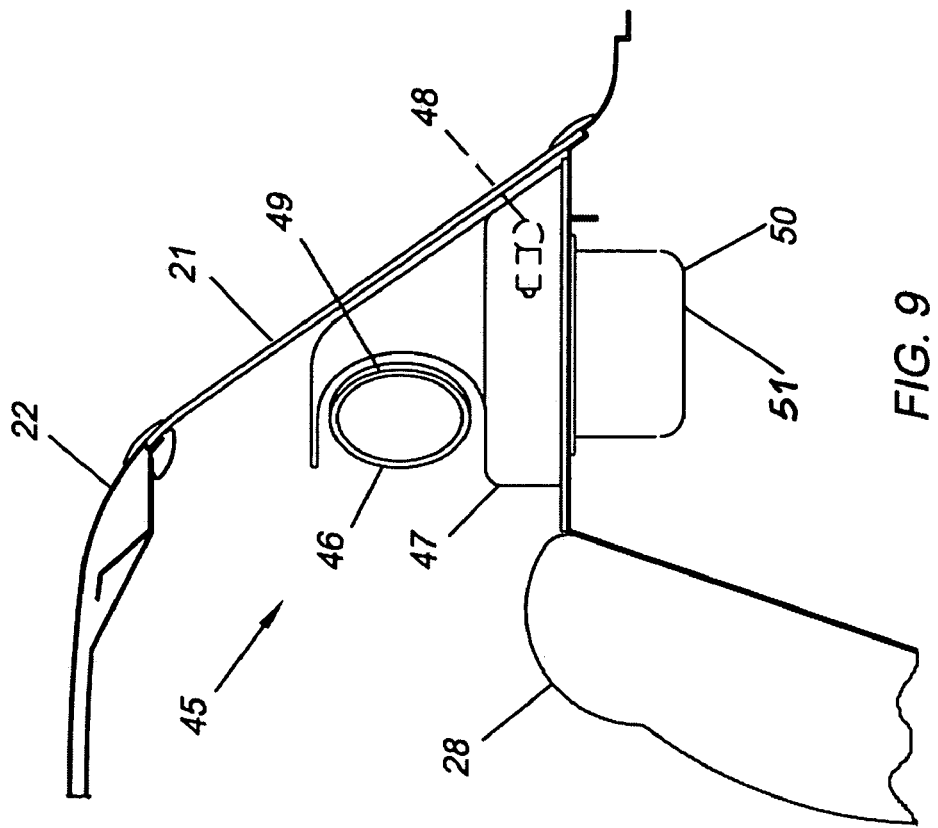
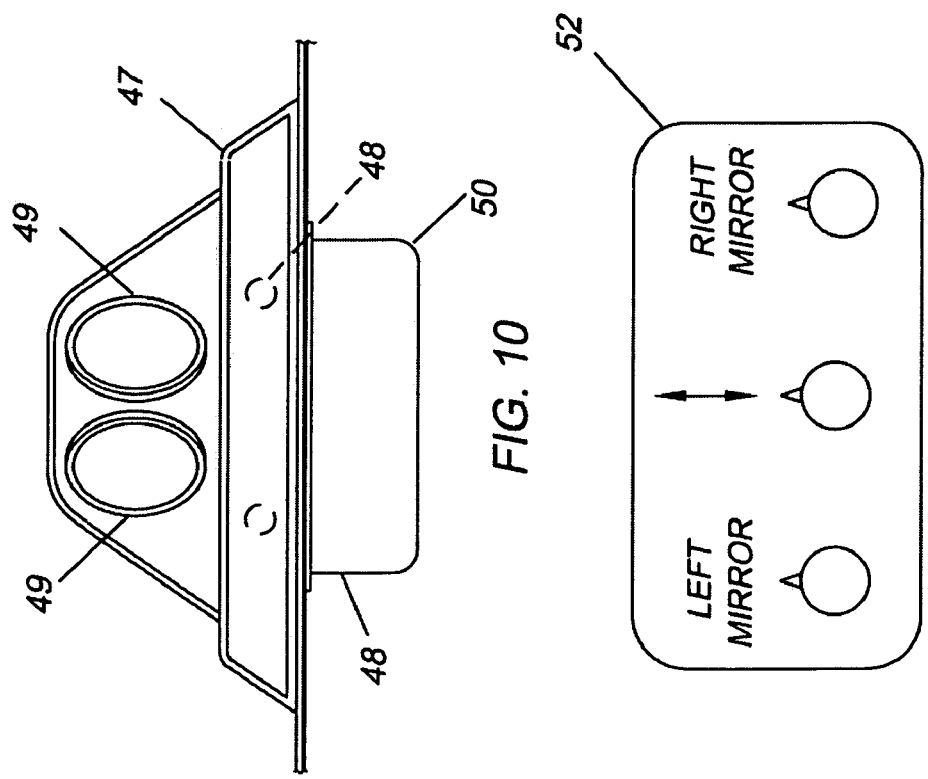

VEHICLE AUXILIARY REAR VIEW MIRROR ASSEMBLY AND METHOD

FIELD OF THE INVENTION

This invention relates to vehicle mirrors and more particularly to a vehicle auxiliary rear view mirror assembly and method for eliminating blind spots in a driver's rear view vision.

BACKGROUND OF THE INVENTION

High speed expressways and traffic congestion have shortened the reaction time requirements for avoiding accidents. During many situations, drivers must act almost instantly to avoid accidents or avoid serious injuries. Higher speed impacts have increased the potential of injuries and deaths from vehicle collisions. When drivers decelerate or make lane changes they must be aware of vehicles surrounding their vehicles to avoid collisions.

There have been virtually no recent advances in improving rear view vision. Blind spots in a driver's field of vision continue to exist at right and left corners of vehicles and are a cause of many serious accidents. Drivers are taught to turn their heads when making lane changes. Diverting a driver's attention from the road is hazardous and exposes him to front end or side collisions.

SUMMARY OF THE INVENTION

The present invention of an auxiliary rear view mirror assembly is a total answer to the problem of blind spots in a driver's side and rear view fields of vision. Most importantly, the auxiliary rear view mirror assembly increases his lateral and rearward fields of vision without diverting his attention from the road. Another benefit is that the invention can be applied to existing vehicles without vehicle changes. A still further benefit is that it is easy to use. Still yet another benefit is that it is moderate in cost.

The invention is broadly comprised of small mirrors pivotally mounted on an interior surface of a rear window. The mirrors are pivotally mounted on a base structure for rotations about a horizontal axis and a pair of vertical axes. A hood over the mirrors shields the mirrors from the sun's rays and headlight rays from other vehicles.

In a first embodiment, the auxiliary rear view mirror assembly is mounted on a rear window. In a second embodiment, the auxiliary rear view mirror assembly is mounted on a rear brake light assembly. In a third embodiment, the auxiliary rear view mirror assembly is remotely adjusted.

In employing the teaching of the present invention, a plurality of alternate constructions can be adopted to achieve the desired objects and capabilities. In this disclosure, several preferred embodiments are described. However, the disclosed embodiments are intended as examples only and should not be considered as limiting the scope of the invention.

Further objects, features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the following diagrammatic drawings illustrating a preferred embodiment by way of non-limiting example only.

FIG. 2 is an enlarged plan view of the invention.

FIG. 3 is an enlarged front view of the invention.

FIG. 4 is an enlarged left side view of the invention.

FIG. 5 is an enlarged partial plan view of the invention.

FIG. 6 is an enlarged partial front view of the invention.

FIG. 7 is an enlarged partial left side view of the invention.

FIG. 9 is a partial longitudinal section through a motor vehicle showing a pair of remotely adjustable auxiliary rear view mirrors.

FIG. 10 is a front view of an alternate embodiment.

FIG. 11 is a front view of driver controls for the alternate embodiment of FIG. 10.

DESCRIPTION OF A PREFERRED EMBODIMENT

Figure 1:
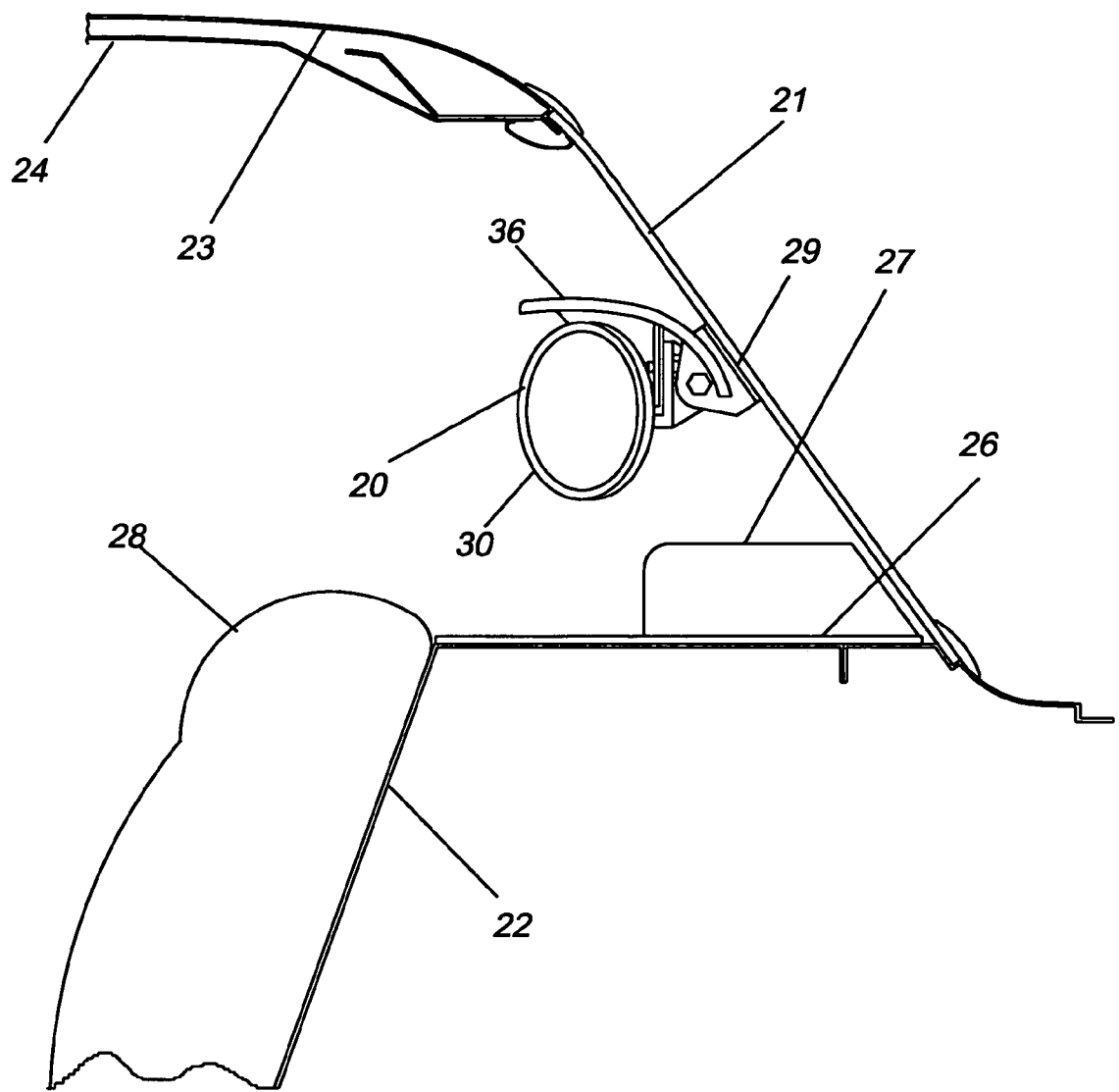
FIG. 1 is a partial longitudinal section through a motor vehicle showing a pair of auxiliary mirrors mounted on an interior surface of a read window.

Referring now to the drawings wherein like numerals designate like and corresponding parts throughout the several views, in FIG. 1 an auxiliary rear view mirror assembly 20 is shown mounted on a rear window 21 of a vehicle 22. The vehicle 21 is typical and consists of a roof panel 23, a cloth headliner 24, a rear window 21, a package tray 26, a rear brake light 27 and a rear seat back cushion 28.

The auxiliary rear view mirror assembly 20 is attached to the rear window 21 by an adhesive or a double sided pressure sensitive adhesive tape 29. The preferred location of the auxiliary rear view mirror assembly 20 is at center of the rear window, an area between rear seat passengers and therefore visible to a driver. The construction of the auxiliary rear view mirror assembly 20 is best understood by reference to FIGS. 2 through 7, inclusive. A pair of identical circular shaped convex mirrors 30 having rearward extending attaching portions 31 are pivotally attached with threaded fasteners 32 to a base structure 33 for rotation about a pair of axes A—A. The mirrors 30 may also be flat and have other shapes (not shown) such as elliptical and rectangular shapes.

The base structure 33 consists of the mirror attaching portion 31 and an adjoining orthogonal channel shaped portion 34. In the orientation of FIGS. 2–7, the mirror attaching portion 31 is horizontal and the adjoining orthogonal channel shaped portion 34 is vertical. The base structure 33 is pivotally attached to a mounting bracket 35 with a pair of threaded fasteners 25 to allow the mirrors 30 about an orthogonal axis B—B.

As shown in FIGS. 2–4, above the mirrors 30 there is a hood 36. Although the hood 36 is not mandatory, it is desirable to prevent solar rays and headlight rays of other vehicles from reflecting into a driver's eyes. The hood 36 is an arcuate shaped member with a thin covering portion 37 and an inward extending portion 38 which is attached to the channel portion 34 of the base structure 33 with a pair of threaded fasteners 39. An inward extending wall portion 40 of the hood 36 separates the auxiliary mirrors 30.

The auxiliary mirror assembly 20 is used in the following manner. The initial step is to apply an adhesive coating or double sided adhesive coated tape 29 to the mounting bracket 35. The mounting bracket 35 is next rotated with respect to the base structure 33 to align the mounting bracket 35 with the rear window 21. The mirror assembly 20 is positioned and bonded on the window 21 as shown in FIG. 1.

The auxiliary mirror assembly 20 is then rotated about the axis B—B to bring the auxiliary mirrors 30 visible in a vehicle's main rear view window (not shown) when a person is facing forward. The auxiliary mirrors 30 are finally individually rotated about the axis A—A to view the previous blind spots from the vehicle's main rear view mirror.

Figure 8:
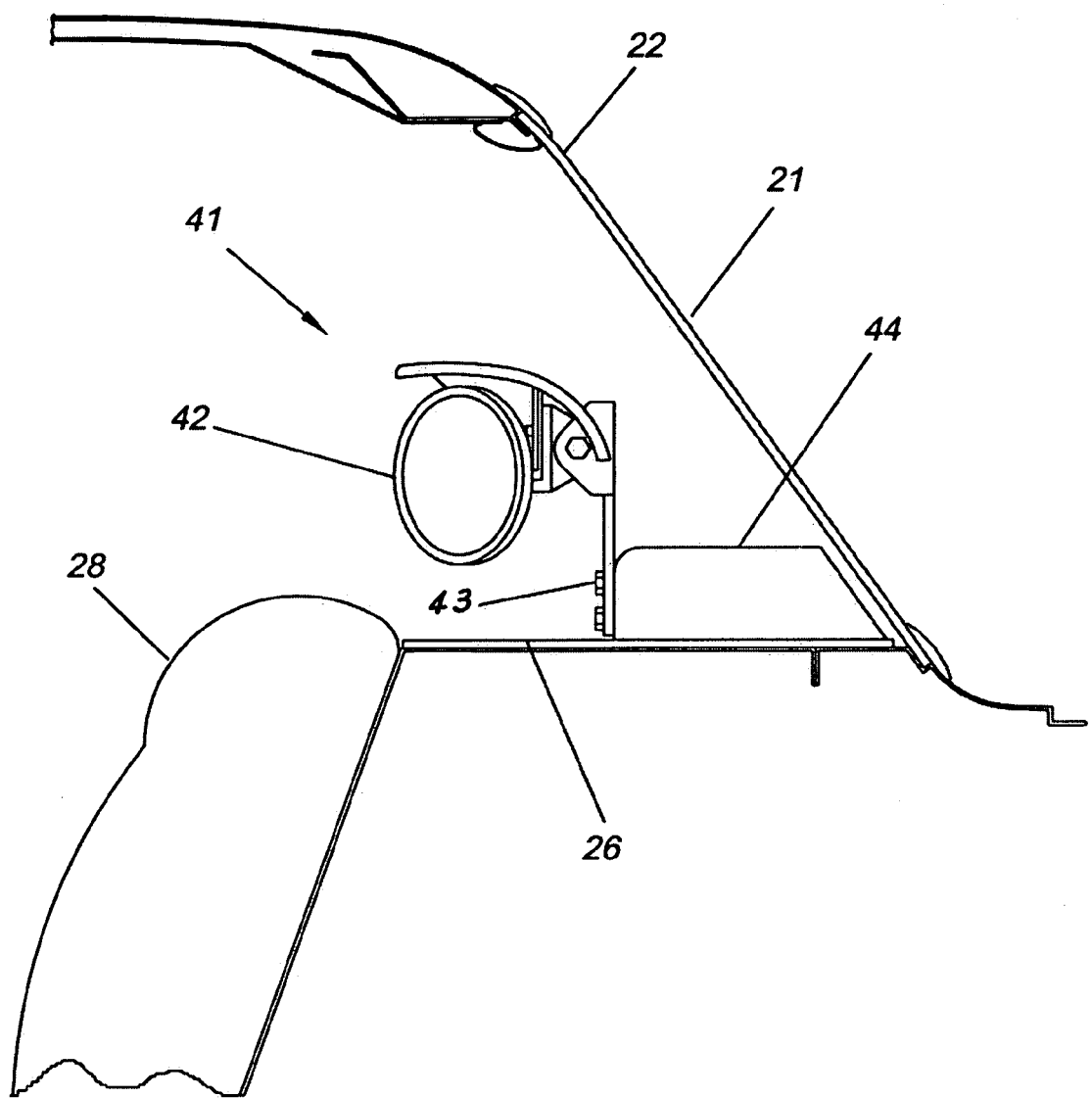
FIG. 8 is a partial longitudinal section through a motor vehicle showing a pair of auxiliary mirrors mounted on a rear brake light.

Referring now to FIG. 8, an alternate embodiment 41 is shown wherein an auxiliary rear view mirror assembly 42 is mounted with threaded fasteners 43 on a rear brake light housing 44. In FIGS. 9–11, an embodiment is shown wherein an auxiliary mirror assembly 46 is combined in a common housing 47 with a rear brake light 48. The auxiliary brake assembly 46 is remotely adjustable from a driver's seat. An auxiliary mirror assembly 46 is comprised of a pair of auxiliary rear view mirrors 49, a drive unit 51 mounted below a package tray 26 and controls 52 which are accessible to a driver. The drive unit 51 is conventional and is comprised of a housing 50, small individual vehicle battery driven stepper motors (not shown) for rotating the mirrors 49 and a conventional solid state control circuit (not shown).

From the foregoing it will be appreciated that our invention is a practical and efficient means for increasing a driver's lateral and rearward field of vision without affecting his forward field of vision. Although only several embodiments have been illustrated and described, it is apparent that other embodiments can be developed by changes in mountings or substitutions, additions, rearrangements and elimination of parts which are obvious to persons skilled in the art without departing from the spirit thereof.

What we claim is new is:

1. An auxiliary rear view mirror assembly for a vehicle adapted to be mounted on an inside surface of a rear window of said vehicle, said auxiliary rear view mirror assembly comprising: a base structure for mounting said auxiliary rear view mirror assembly on said inside surface of said rear window, said base structure having a U-shaped first bracket, said first bracket having a wall for mounting said base structure on said inside surface of said rear window and a pair of depending side walls for attaching a second bracket to said first bracket to manually rotate a pair of diverging auxiliary rear view mirrors and said second bracket about a horizontal axis and to rotate each of said pair of diverging mirrors about a second axis which is in orthogonal relationship to said horizontal axis, said second bracket having a U-shaped portion for attaching said second bracket to said first bracket and a depending wall for mounting said pair of auxiliary rear view mirrors to said second bracket and to independently rotate each of said diverging auxiliary rear view mirrors about said second axis which is in orthogonal relationship to said horizontal axis; each of said pair of diverging auxiliary rear view mirrors being viewable in a main rear view mirror of said vehicle by a forward facing driver of said vehicle to increase said drivers field of vision at a rear of said vehicle without adversely affecting said driver's forward field of vision; and a hood mounted above said mirrors for preventing solar rays and headlight rays from other vehicles from reflecting into the driver's eyes.

2. The auxiliary rear view mirror assembly recited in claim 1 wherein said auxiliary rear view mirrors are circular shaped mirrors.

3. The auxiliary rear view mirror assembly recited in claim 2 wherein said circular auxiliary rear view mirrors are convex shaped mirrors.

* * * * *